United States Patent
Lee et al.

(10) Patent No.: US 10,231,207 B2
(45) Date of Patent: Mar. 12, 2019

(54) METHOD FOR RECEIVING REFERENCE SIGNAL IN WIRELESS COMMUNICATION SYSTEM AND APPARATUS THEREFOR

(71) Applicant: LG ELECTRONICS INC., Seoul (KR)

(72) Inventors: Hyunho Lee, Seoul (KR); Hanjun Park, Seoul (KR); Kijun Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 4 days.

(21) Appl. No.: 15/507,200

(22) PCT Filed: Aug. 26, 2015

(86) PCT No.: PCT/KR2015/008904
§ 371 (c)(1),
(2) Date: Feb. 27, 2017

(87) PCT Pub. No.: WO2016/032219
PCT Pub. Date: Mar. 3, 2016

(65) Prior Publication Data
US 2017/0289948 A1    Oct. 5, 2017

Related U.S. Application Data

(60) Provisional application No. 62/172,775, filed on Jun. 8, 2015, provisional application No. 62/042,778, filed on Aug. 27, 2014.

(51) Int. Cl.
*H04W 4/00* (2018.01)
*H04W 64/00* (2009.01)
(Continued)

(52) U.S. Cl.
CPC ......... *H04W 64/003* (2013.01); *G01S 5/0236* (2013.01); *H04L 5/0035* (2013.01);
(Continued)

(58) Field of Classification Search
CPC ....... H04L 5/00; H04L 5/0053; H04L 5/0035; H04L 5/0051; H04L 5/0048; H04W 64/003; H04W 64/00; H04W 24/10; G01S 5/0236
See application file for complete search history.

(56) References Cited

U.S. PATENT DOCUMENTS

| 8,428,022 B2 * | 4/2013 | Frank | H04L 5/0048 370/329 |
| 8,576,822 B2 * | 11/2013 | Yoon | H04L 5/0023 370/342 |

(Continued)

FOREIGN PATENT DOCUMENTS

| KR | 1020120095398 | 8/2012 |
| KR | 1020140081498 | 7/2014 |

(Continued)

OTHER PUBLICATIONS

PCT International Application No. PCT/KR2015/008903, Notification of Transmittal of the International Search Report and the Written Opinion of the International Searching Authority, or Declaration dated Jan. 26, 2016, 9 pages.

(Continued)

*Primary Examiner* — Frank Duong
(74) *Attorney, Agent, or Firm* — Lee Hong Degerman Kang Waimey

(57) ABSTRACT

A method for receiving a reference signal for determining a position in a wireless communication system, according to one embodiment of the present invention, may comprise the steps of: receiving positioning reference signal (PRS)-related configuration information transmitted from a plurality of antenna ports; and measuring the PRS by using the PRS-related configuration information, wherein the PRS may be mapped by being multiplexed with resource elements (RE) of each of the plurality of antenna ports.

10 Claims, 11 Drawing Sheets

(51) Int. Cl.
    *G01S 5/02*          (2010.01)
    *H04L 5/00*         (2006.01)
    *H04W 24/10*      (2009.01)

(52) U.S. Cl.
    CPC .......... *H04L 5/0048* (2013.01); *H04L 5/0051* (2013.01); *H04L 5/0053* (2013.01); *H04W 24/10* (2013.01); *H04W 64/00* (2013.01)

(56) References Cited

U.S. PATENT DOCUMENTS

| | | | |
|---|---|---|---|
| 8,989,768 B2 * | 3/2015 | Woo | G01S 5/0221 |
| | | | 455/456.1 |
| 9,072,066 B2 * | 6/2015 | Kazmi | H04W 64/00 |
| 9,332,443 B2 | 5/2016 | Xiao et al. | |
| 9,766,323 B2 | 9/2017 | Liu | |
| 10,033,449 B2 * | 7/2018 | Lee | H04W 24/10 |
| 2010/0260154 A1 | 10/2010 | Frank et al. | |
| 2011/0105144 A1 | 5/2011 | Siomina et al. | |
| 2012/0015667 A1 | 1/2012 | Woo et al. | |
| 2012/0027110 A1 * | 2/2012 | Han | H04J 11/0079 |
| | | | 375/260 |
| 2012/0046047 A1 | 2/2012 | Popovic et al. | |
| 2012/0183028 A1 | 7/2012 | Han et al. | |
| 2012/0231809 A1 | 9/2012 | Siomina et al. | |
| 2013/0122930 A1 * | 5/2013 | Woo | G01S 5/0205 |
| | | | 455/456.1 |
| 2014/0176366 A1 | 6/2014 | Fischer et al. | |
| 2016/0205651 A1 | 7/2016 | Isa et al. | |
| 2017/0289948 A1 | 10/2017 | Lee et al. | |

FOREIGN PATENT DOCUMENTS

| | | |
|---|---|---|
| KR | 1020140089249 | 7/2014 |
| WO | 2013137645 | 9/2013 |
| WO | 2014029242 | 2/2014 |

OTHER PUBLICATIONS

U.S. Appl. No. 13/014,665, Office Action dated Nov. 29, 2012, 24 pages.

* cited by examiner

METHOD FOR RECEIVING REFERENCE SIGNAL IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2015/008904, filed on Aug. 26, 2015, which claims the benefit of U.S. Provisional Application No. 62/042,778, filed on Aug. 27, 2014 and 62/172,775, filed on Jun. 8, 2015, the contents of which are all hereby incorporated by reference herein in their entirety.

TECHNICAL FIELD

The present invention relates to a wireless communication system, and more particularly, to a method for receiving a reference signal in a wireless communication system and an apparatus therefor.

BACKGROUND ART

Various devices (e.g., smartphones, tablet PCs, etc.) and technologies requiring Machine-to-Machine (M2M) communications and high data throughputs continue to appear and tend to be popularized. And, a data amount necessary to be processed on a cellular network is increasing very fast. In order to meet the fast increasing data processing requirement amount, technologies (e.g., carrier aggregation technology, cognitive radio technology, etc.) for using more frequency bands efficiently and technologies (e.g., multi-antenna technology, multi-base station cooperation technology, etc.) for increasing data capacity transmitted within a limited frequency are developed. And, a communication environment is evolved in a direction of increasing density of nodes accessible by a nearby user equipment. A node means a fixed point capable of transmitting/receiving a radio signal to/from a user equipment by being equipped with at least one antenna. A communication system equipped with nodes of high density can provide a user equipment with a communication service of high performance by cooperation between the nodes.

According to the multinode cooperative communication scheme of performing communication with a user equipment using the same time-frequency resource at a plurality of nodes, since each node operates as an independent base station, such a scheme has performance much better than that of an existing communication scheme of performing communication with a user equipment without mutual cooperation.

A multinode system performs a cooperative communication using a plurality of nodes that operate as a base station (or, access point), an antenna, an antenna group, a radio remote header (RRH) and a radio remote unit (RRU). Unlike the existing center concentrated antenna system having antennas concentrated on a base station, a plurality of the nodes in the multinode system are located in a manner of being spaced apart from each other over a predetermined interval. A plurality of the nodes can be operated by at least one base station or a base station controller configured to control an operation of each node or schedule data to be transmitted/received through each node. And, each of the nodes is connected to the base station or the base station controller configured to operate the corresponding node through a cable or a dedicated line.

Such a multinode system may be regarded as a sort of MIMO (multiple input multiple output) system in that distributed nodes can communicate with single or multiple users by transmitting/receiving different streams simultaneously. Yet, since the multinode system transmits a signal using the nodes distributed to various locations, a transmitting area supposed to be covered by each antenna is reduced in comparison with antennas provided to an existing centralized antenna system. Hence, compared to the existing system capable of implementing the MIMO technology in the centralized antenna system, the multinode system can reduce a transmit power required for each antenna to transmit a signal. Moreover, since a transmitting distance between an antenna and a user equipment is reduced, a pathloss is reduced and a fast transmission of data is enabled. Hence, transmission capacity and power efficiency of a cellular system can be raised and a communication performance of a relatively uniform quality can be met irrespective of a location of a user equipment within a cell. In the multinode system, since base station(s) or base station controller(s) connected to a plurality of nodes cooperates for data transmission/reception, a signal loss generated from a transmitting process is reduced. In case that nodes located by being spaced apart from each other over a predetermined distance perform cooperative communication with a user equipment, correlation and interference between antennas are reduced. Hence, according to the multinode cooperative communication scheme, it is able to obtain a high SINR (signal to interference-plus-noise ratio).

Owing to the advantages of the multinode system mentioned in the above description, in order to extend a service coverage and improve channel capacity and SINR as well as reduce a base station establishment cost and a maintenance cost of a backhaul network in a next generation mobile communication system, the multinode system is used together with or substituted with the existing centralized antenna system, thereby emerging as a new base of a cellular communication.

DISCLOSURE

Technical Problem

An object of the present invention is to provide a method for receiving a reference signal in a wireless communication system and an operation related therewith.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

Provided is a method for receiving a reference signal for positioning in a wireless communication system according to one embodiment of the present invention comprises receiving positioning reference signal (PRS) related configuration information transmitted from a plurality of antenna ports; and measuring the PRS by using the PRS related configuration information, wherein the PRS may be multiplexed and mapped to resource elements (REs) of each of the plurality of antenna ports.

Additionally or alternatively, an orthogonal cover code for code division multiplexing (CDM) may be used for mapping of the REs, and may be designated for each of the plurality of antenna ports.

Additionally or alternatively, the method may further comprise receiving information on an orthogonal cover code for each of the plurality of antenna ports.

Additionally or alternatively, the PRS may be mapped to a specific RE within OFDM symbols, to which the PRS is not mapped in a non-MBSFN (multicast and broadcast single frame network) subframe, in an MBSFN subframe.

Additionally or alternatively, the plurality of antenna ports relate to a plurality of transmission devices, and if the plurality of transmission devices use the same physical cell ID, each transmission device may transmit the PRS through different ones of the plurality of antenna ports.

Additionally or alternatively, of the measuring the PRS may further include measuring the PRS for each of the plurality of transmission devices.

Additionally or alternatively, the method may further comprise reporting a measurement result of the PRS, wherein the measurement result of the PRS may include a measurement result of the PRS for each of the plurality of transmission devices.

Additionally or alternatively, the PRS related configuration information may include at least one of information about an antenna port used for the PRS transmission, information about a subframe in which each antenna port transmits the PRS within a positioning occasion for the PRS transmission, information about an orthogonal cover code applied to each antenna port, or PRS RE mapping information for each antenna port.

A terminal configured to receive a reference signal for positioning in a wireless communication system according to one embodiment of the present invention comprises a radio frequency (RF) unit; and a processor configured to control the RF unit, wherein the processor may be configured to receive positioning reference signal (PRS) related configuration information transmitted from a plurality of antenna ports and measure the PRS by using the PRS related configuration information, and the PRS may be multiplexed and mapped into resource elements (REs) of each of the plurality of antenna ports Additionally or alternatively, an orthogonal cover code for code division multiplexing (CDM) may be used for mapping of the REs, and may be designated for each of the plurality of antenna ports.

Additionally or alternatively, the processor may be configured to receive information on an orthogonal cover code for each of the plurality of antenna ports.

Additionally or alternatively, the PRS may be mapped to a specific RE within OFDM symbols, to which the PRS is not mapped in a non-MBSFN (multicast and broadcast single frame network) subframe, in an MBSFN subframe.

Additionally or alternatively, the plurality of antenna ports relate to a plurality of transmission devices, and if the plurality of transmission devices use the same physical cell ID, each transmission device may transmit the PRS through different ones of the plurality of antenna ports.

Additionally or alternatively, the processor may be configured to measure the PRS for each of the plurality of transmission devices.

Additionally or alternatively, the processor may be configured to report a measurement result of the PRS, wherein the measurement result of the PRS may include a measurement result of the PRS for each of the plurality of transmission devices.

Additionally or alternatively, the PRS related configuration information may include at least one of information about an antenna port used for the PRS transmission, information about a subframe in which each antenna port transmits the PRS within a positioning occasion for the PRS transmission, information about an orthogonal cover code applied to each antenna port, or PRS RE mapping information for each antenna port.

The above technical solutions are merely some parts of the embodiments of the present invention and various embodiments into which the technical features of the present invention are incorporated can be derived and understood by persons skilled in the art from the following detailed description of the present invention.

Advantageous Effects

According to one embodiment of the present invention, reception of a reference signal and measurement of the reference signal can efficiently be performed in a wireless communication system.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
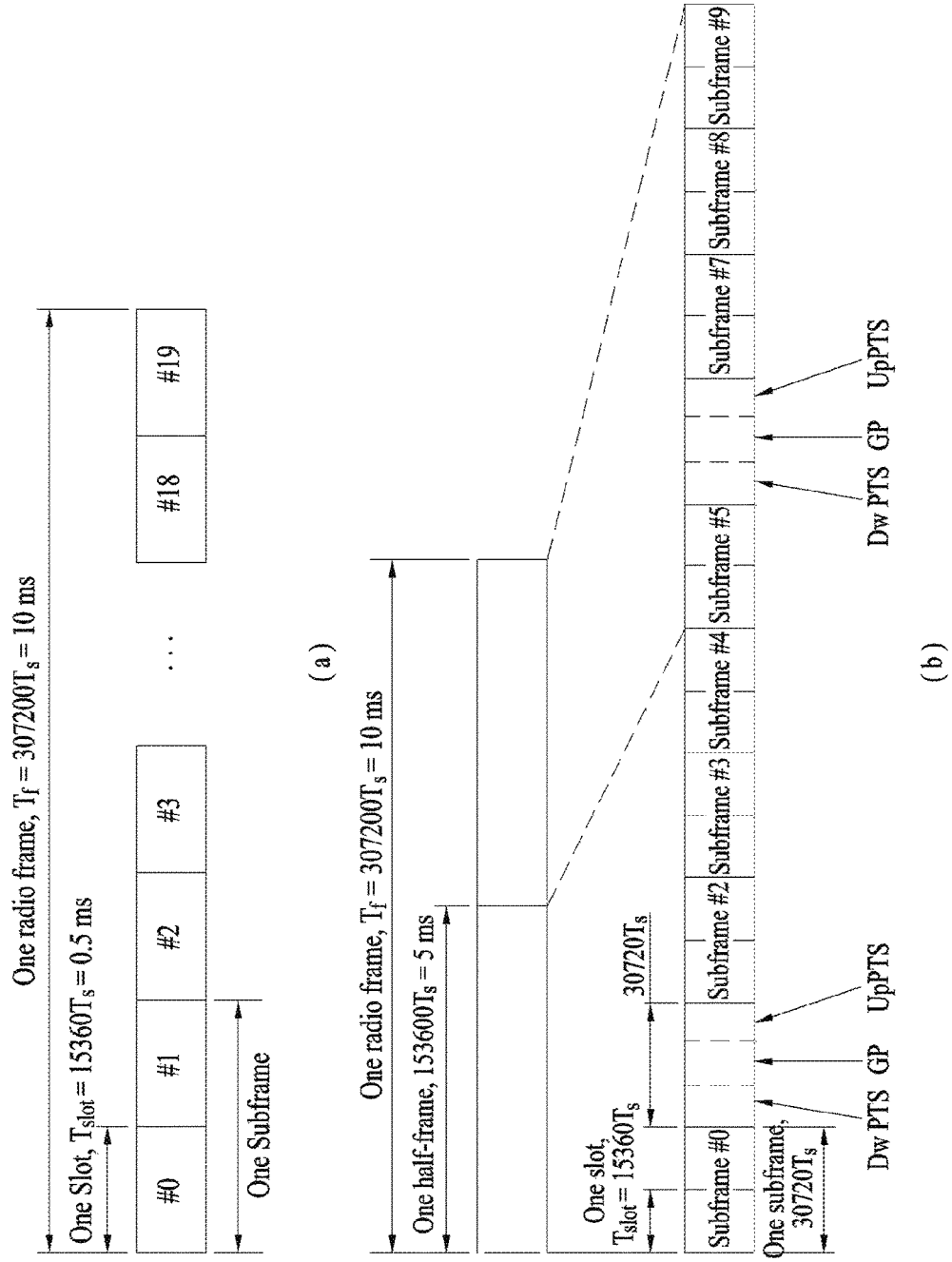
FIG. 1 is diagram illustrating an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | \multicolumn{10}{c}{Subframe number} |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | | Normal cyclic prefix in downlink | | | Extended cyclic prefix in downlink | | |
| | | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
|---|---|---|---|---|---|---|
| 0 | $6592 \cdot T_s$  | $2192 \cdot T_s$ | $2560 \cdot T_s$ | $7680 \cdot T_s$  | $2192 \cdot T_s$ | $2560 \cdot T_s$ |
| 1 | $19760 \cdot T_s$ |                  |                  | $20480 \cdot T_s$ |                  |                  |
| 2 | $21952 \cdot T_s$ |                  |                  | $23040 \cdot T_s$ |                  |                  |
| 3 | $24144 \cdot T_s$ |                  |                  | $25600 \cdot T_s$ |                  |                  |
| 4 | $26336 \cdot T_s$ |                  |                  | $7680 \cdot T_s$  | $4384 \cdot T_s$ | $5120 \cdot T_s$ |
| 5 | $6592 \cdot T_s$  | $4384 \cdot T_s$ | $5120 \cdot T_s$ | $20480 \cdot T_s$ |                  |                  |
| 6 | $19760 \cdot T_s$ |                  |                  | $23040 \cdot T_s$ |                  |                  |
| 7 | $21952 \cdot T_s$ |                  |                  | $12800 \cdot T_s$ |                  |                  |
| 8 | $24144 \cdot T_s$ |                  |                  | —                 | —                | —                |
| 9 | $13168 \cdot T_s$ |                  |                  | —                 | —                | —                |

Figure 2:
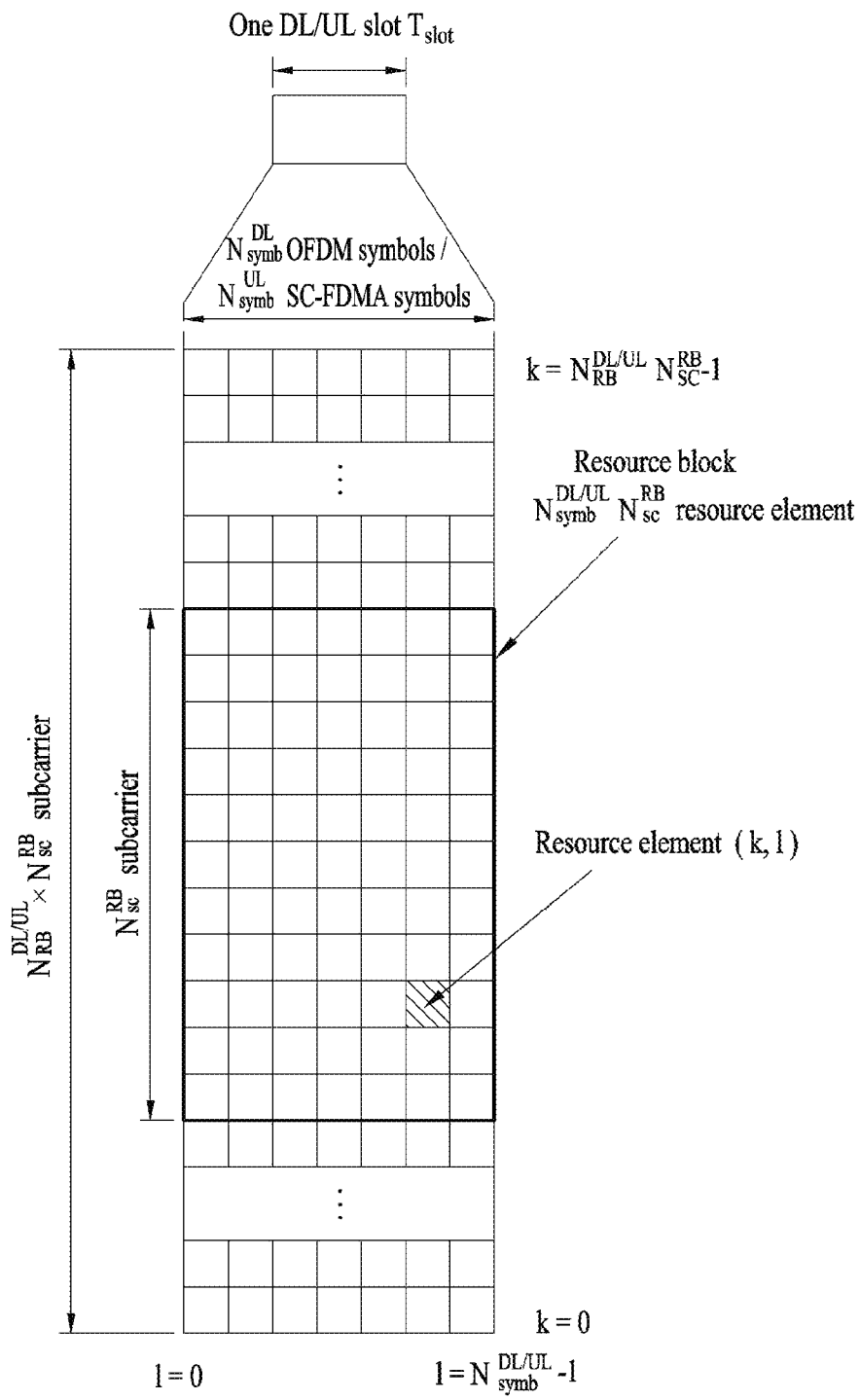
FIG. 2 is diagram illustrating an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
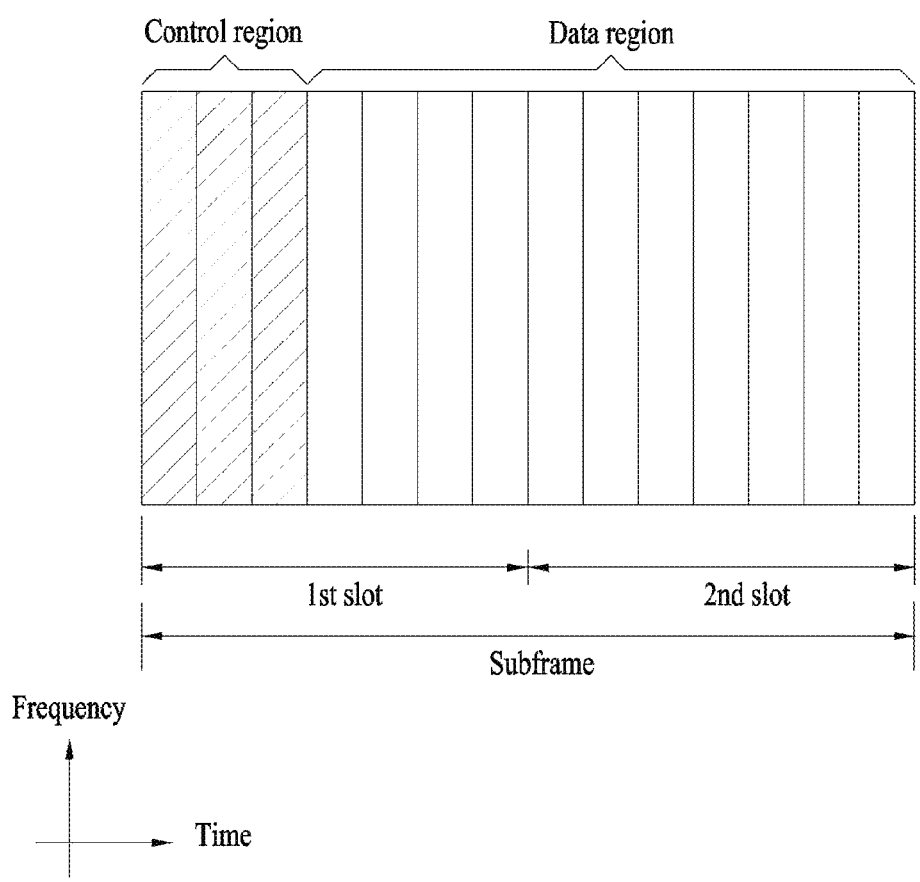
FIG. 3 is diagram illustrating an example of a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space Type | Aggregation Level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
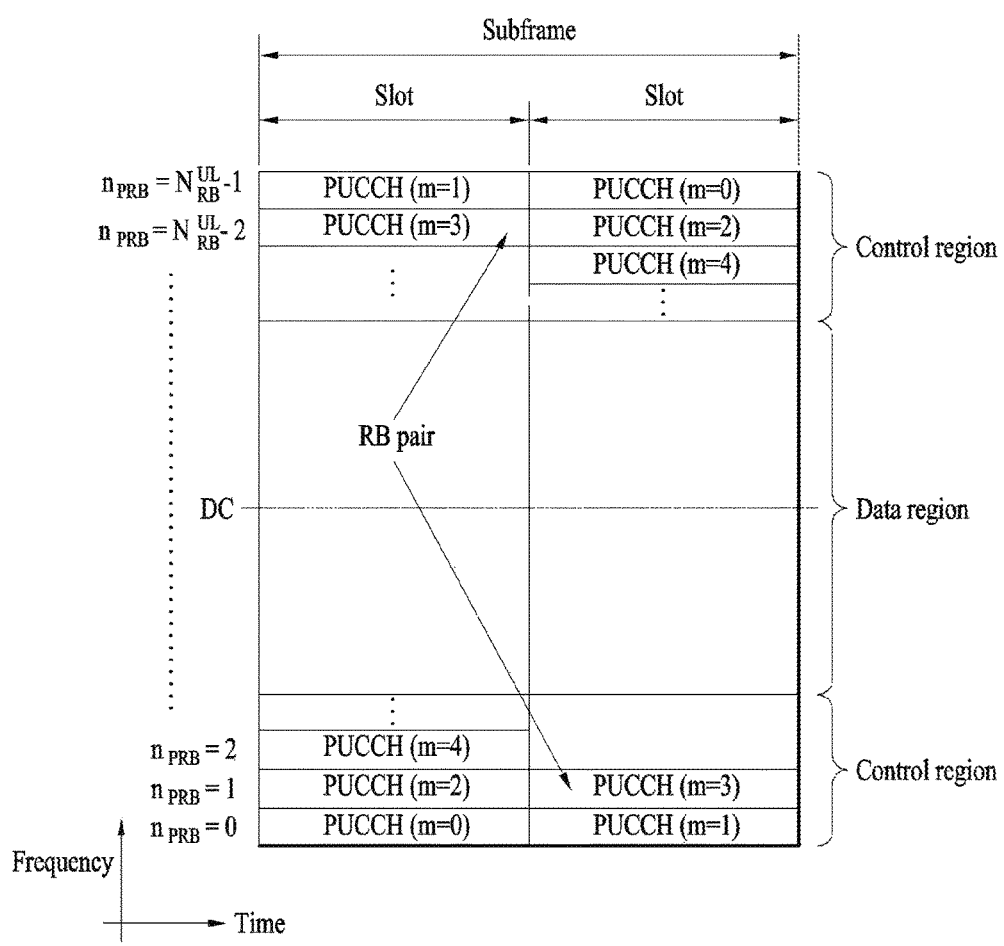
FIG. 4 is diagram illustrating an example of an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Generally, in a cellular communication system, various methods for acquiring position information of a UE in a network are used. Representatively, a positioning scheme based on OTDOA (observed time difference of arrival) exists in the LTE system. According to the positioning scheme, the UE may be configured to receive PRS (positioning reference signal) transmission related information of base stations from a higher layer signal, and may transmit a reference signal time difference (RSTD) which is a difference between a reception time of a PRS transmitted from a reference base station and a reception time of a PRS transmitted from a neighboring base station to a base station or network by measuring PRS transmitted from cells in the periphery of the UE, and the network calculates a position of the UE by using RSTD and other information. In addition, other schemes such as an A-GNSS (Assisted Global Navigation Satellite System) positioning scheme, an E-CID (Enhanced Cell-ID) scheme, and a UTDOA (Uplink Time Difference of Arrival) exist, and various location-based services (for example, advertisements, position tracking, emergency communication means, etc.) may be used based on these positioning schemes.

[LTE Positioning Protocol]

In the LTE system, an LPP (LTE positioning protocol) has been defined, and notifies the UE of OTDOA-ProvideAssistanceData having the following configuration through IE (information element).

```
-- ASN1START
OTDOA-ProvideAssistanceData ::= SEQUENCE {
    otdoa-ReferenceCellInfo     OTDOA-ReferenceCellInfo OPTIONAL, -- Need ON
    otdoa-NeighbourCellInfo     OTDOA-NeighbourCellInfoList OPTIONAL, -- Need ON
    otdoa-Error      OTDOA-Error OPTIONAL, -- Need ON
    ...
}
-- ASN1STOP
```

In this case, OTDOA-ReferenceCellInfo means a cell which is a reference of RSTD measurement, and is configured as follows.

```
--ASN1START
OTDOA-ReferenceCellInfo ::= SEQUENCE {
    physCellId       INTEGER (0..503),
    cellGlobalId     ECGI    OPTIONAL, -- Need ON
    earfcnRef        ARFCN-ValueEUTRA OPTIONAL, --Cond NotSameAsServ0
    antennaPortConfig    ENUMERATED {ports1-or-2, ports4, ... } OPTIONAL,    --CondNotSameAsServ1
    cpLength ENUMERATED { normal, extended, ... },
    prsInfo PRS-Info     OPTIONAL, -- Cond PRS
    ...,
    [[ earfcnRef-v9a0       ARFCN-ValueEUTRA-v9a0 OPTIONAL --  Cond NotSameAsServ2
    ]]
```

```
        }
    -- ASN1STOP
```

Meanwhile, OTDOA-NeighbourCellInfo means cells (for example, eNB or TP) which is a target for RSTD measurement, and may include information on maximum 24 neighboring cells per frequency layer with respect to maximum three frequency layers. That is, OTDOA-NeighbourCellInfo may notify the UE of information on a total of 3*24=72 cells.

```
    -- ASN1START
    OTDOA-NeighbourCellInfoList ::= SEQUENCE (SIZE (1..maxFreqLayers)) OF
OTDOA-NeighbourFreqInfo
    OTDOA-NeighbourFreqInfo ::= SEQUENCE (SIZE (1..24)) OF OTDOA-
NeighbourCellInfoElement
    OTDOA-NeighbourCellInfoElement ::= SEQUENCE {
      physCellId        INTEGER (0..503),
      cellGlobalId ECGI OPTIONAL, -- Need ON
      earfcn ARFCN-ValueEUTRA    OPTIONAL,         --      Cond
NotSameAsRef0
      cpLength      ENUMERATED {normal, extended, ...}
OPTIONAL,      -- Cond NotSameAsRef1
      prsInfo      PRS-Info       OPTIONAL, -- Cond NotSameAsRef2
      antennaPortConfig   ENUMERATED {ports-1-or-2, ports-4, ...}
OPTIONAL,          -- Cond NotsameAsRef3
      slotNumberOffset    INTEGER (0..19)     OPTIONAL, --    Cond
NotSameAsRef4
      prs-SubframeOffset  INTEGER (0..1279)   OPTIONAL,    --    Cond
InterFreq
      expectedRSTD        INTEGER (0..16383),
      expectedRSTD-Uncertainty INTEGER (0..1023),
      ...,
      [[ earfcn-v9a0      ARFCN-ValueEUTRA-v9a0 OPTIONAL    --   Cond
NotSameAsRef5
      ]]
    }
    maxFreqLayers     INTEGER ::= 3
    -- ASN1STOP
```

TABLE 5

| PRS Configuration Index ($I_{PRS}$) | PRS Periodicity (subframes) | PRS Subframe Offset (subframes) |
|---|---|---|
| 0-159 | 160 | $I_{PRS}$ |
| 160-479 | 320 | $I_{PRS}$-160 |

In this case, PRS-Info which is IE included in OTDOA-ReferenceCellInfo and OTDOA-NeighbourCellInfo has PRS information, and is specifically configured, as follows, as PRS Bandwidth, PRS Configuration Index (IPRS), Number of Consecutive Downlink Subframes, and PRS Muting Information.

TABLE 5-continued

| PRS Configuration Index ($I_{PRS}$) | PRS Periodicity (subframes) | PRS Subframe Offset (subframes) |
|---|---|---|
| 480-1119 | 640 | $I_{PRS}$-480 |
| 1120-2339 | 1280 | $I_{PRS}$-1120 |

```
PRS-Info ::= SEQUENCE {
  prs-Bandwidth      ENUMERATED { n6, n15, n25, n50, n75, n100, ... },
  prs-ConfigurationIndex    INTEGER (0..4095),
  numDL-Frames    ENUMERATED {sf-1, sf-2, sf-4, sf-6, ...},
  ...,
  prs-MutingInfo-r9  CHOICE {
    po2-r9    BIT STRING (SIZE(2)),
    po4-r9    BIT STRING (SIZE(4)),
    po8-r9    BIT STRING (SIZE(8)),
    po16-r9   BIT STRING (SIZE(16)),
  ...
  } OPTIONAL     -- Need OP
}
-- ASN1STOP
```

Figure 5:
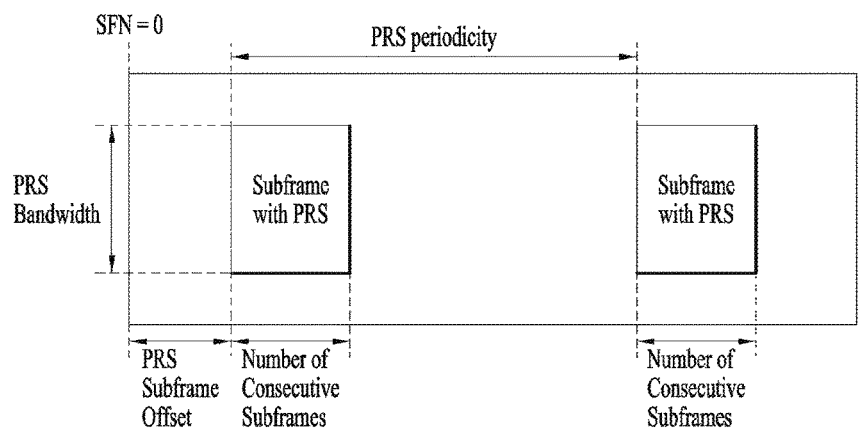
FIG. 5 is a diagram illustrating a PRS transmission structure.

FIG. 5 illustrates a PRS transmission structure according to the above parameters.

At this time, PRS Periodicity and PRS Subframe Offset are determined in accordance with a value of PRS Configuration Index (IPRS), and their correlation is as follows.

[PRS (Positioning Reference Signal)]

Figure 6:
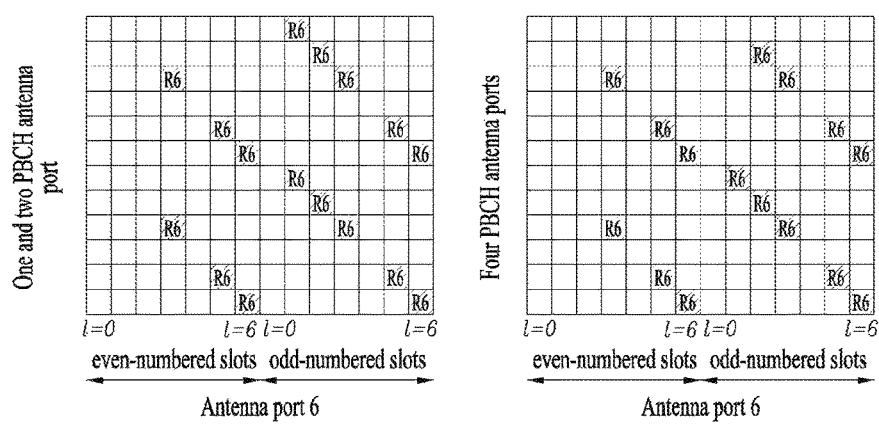
FIGS. 6 and 7 are diagrams illustrating RE mapping a PRS (positioning reference signal)

The PRS has a transmission occasion, that is, a positioning occasion at a period of 160, 320, 640, or 1280 ms, and may be transmitted for N DL subframes consecutive for the positioning occasion. In this case, N may have a value of 1, 2, 4 or 6. Although the PRS may be transmitted substantially at the positioning occasion, the PRS may be muted for inter-cell interference control cooperation. Information on such PRS muting is signaled to the UE as prs-MutingInfo. A transmission bandwidth of the PRS may be configured independently unlike a system bandwidth of a serving base station, and is transmitted to a frequency band of 6, 15, 25, 50, 75 or 100 resource blocks (RBs). Transmission sequences of the PRS are generated by initializing a pseudo-random sequence generator for every OFDM symbol using a function of a slot index, an OFDM symbol index, a cyclic prefix (CP) type, and a cell ID. The generated transmission sequences of the PRS are mapped to resource elements (REs) depending on a normal CP or an extended CP as shown in FIG. 6 (normal CP) and FIG. 7 (extended CP). A position of the mapped REs may be shifted on the frequency axis, and a shift value is determined by a cell ID. The positions of the REs for transmission of the PRS shown in FIGS. 6 and 7 correspond to the case that the frequency shift is 0.

The UE receives designated configuration information on a list of PRSs to be searched from a position management server of a network to measure PRSs. The corresponding information includes PRS configuration information of a reference cell and PRS configuration information of neighboring cells. The configuration information of each PRS includes a generation cycle and offset of a positioning occasion, and the number of continuous DL subframes constituting one positioning occasion, cell ID used for generation of PRS sequences, a CP type, the number of CRS antenna ports considered at the time of PRS mapping, etc. In addition, the PRS configuration information of the neighboring cells includes a slot offset and a subframe offset of the neighboring cells and the reference cell, an expected RSTD, and a level of uncertainty of the expected RSTD to support determination of the UE when the UE determines a timing point and a level of time window used to search for the PRS to detect the PRS transmitted from the neighboring cell.

Meanwhile, the RSTD refers to a relative timing difference between an adjacent or neighboring cell j and a reference cell i. In other words, the RSTD may be expressed by $T_{subframeRxj}-T_{subframeRxi}$, wherein $T_{subframeRxj}$ refers to a timing point at which a UE starts to receive a specific subframe from the neighboring cell j, and $T_{subframeRxi}$ refers to a timing point at which a UE starts to receive a subframe, which is closest to the specific subframe received from the neighboring cell j in terms of time and corresponds to the specific subframe, from the reference cell i. A reference point for an observed subframe time difference is an antenna connector of the UE.

Although the aforementioned positioning schemes of the related art are already supported by the 3GPP UTRA and E-UTRAN standard (for example, (LTE Rel-9), higher accuracy is recently required for an in-building positioning scheme. That is, although the positioning schemes of the related art may commonly be applied to outdoor/indoor environments, in case of E-CID scheme, general positioning accuracy is known as 150 m in a non-LOS (NLOS) environment and as 50 m in a LOS environment. Also, the OTDOA scheme based on the PRS has a limit in a positioning error, which may exceed 100 m, due to an eNB synchronization error, a multipath propagation error, a quantization error in RSTD measurement of a UE, and a timing offset estimation error. Also, since a GNSS receiver is required in case of the A-GNSS scheme, the A-GNSS scheme has a limit in complexity and battery consumption, and has a restriction in using in-building positioning.

In this specification, a cellular network basically transmits a specific pilot signal (for example, specific reference signal type identifiable separately per base station/TP (transmission point)) to the UE, and the UE calculates a positioning related estimation value (for example, OTDOA and RSTD estimation value) based on a specific positioning scheme by measuring each pilot signal and then reports the calculated value to the base station, whereby a method for calculating position information of the corresponding UE at a base station terminal is considered.

Figure 7:
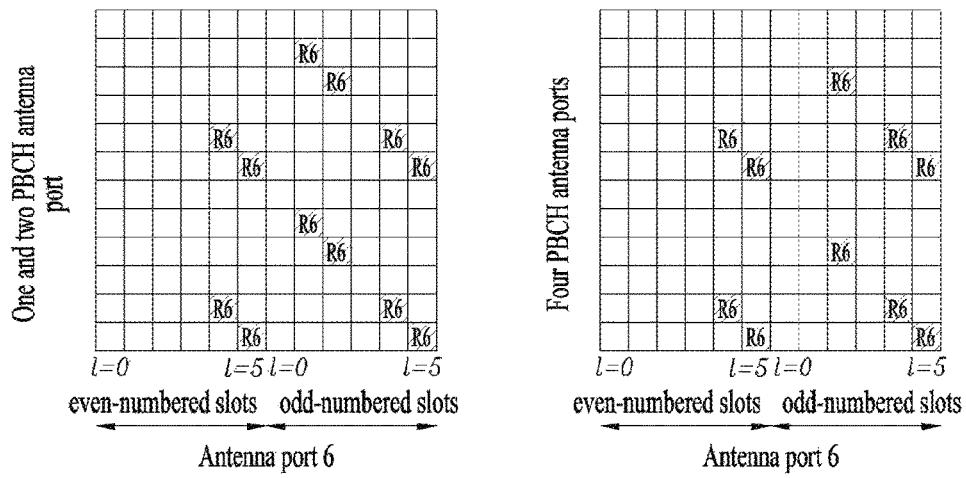

According to the LTE standard, the PRS is designed such that the PRS is set to a single antenna port as shown in FIGS. 6 and 7 to calculate a positioning related estimation value of the UE. However, as described above, to more improve positioning accuracy, a method for transmitting the PRS from a plurality of antenna ports may be considered. In this specification, a detailed method for transmitting the PRS from a plurality of antenna ports will be suggested.

Figure 8:
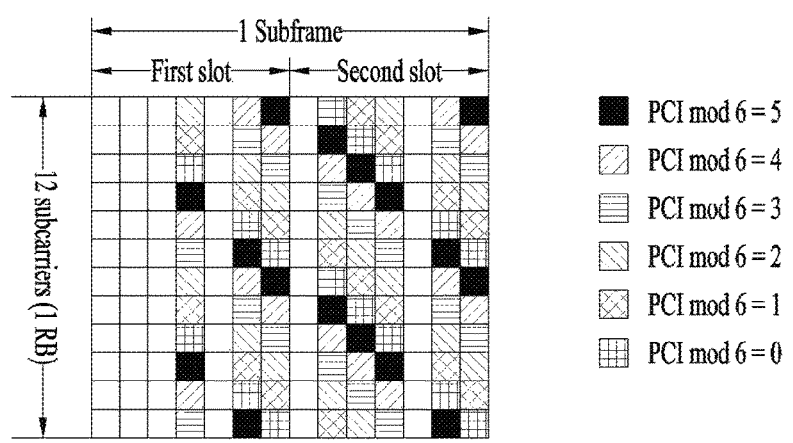
FIG. 8 is a diagram illustrating PRS RE mapping frequency shifted in accordance with physical cell ID.

PRS RE mapping according to the 3GPP LTE standard may be shifted on the frequency axis in accordance with physical cell ID as shown in FIG. 8. Referring to FIG. 8, the UE performs positioning related measurement by using the PRS transmitted from neighboring base stations/TPs, and to assist the positioning related measurement of the UE, the PRS is mapped into different REs in accordance with the physical cell ID to minimize interference caused by the PRS transmitted from the neighboring base stations/TPs. Therefore, it is not preferable that the PRS is transmitted to REs which will be used by other base station/TP in addition to REs designated to be used for PRS transmission by a specific base station/TP. One embodiment of the present invention suggests that various multiplexing schemes should be considered to define a plurality of antenna ports for the PRS.

Figure 9:
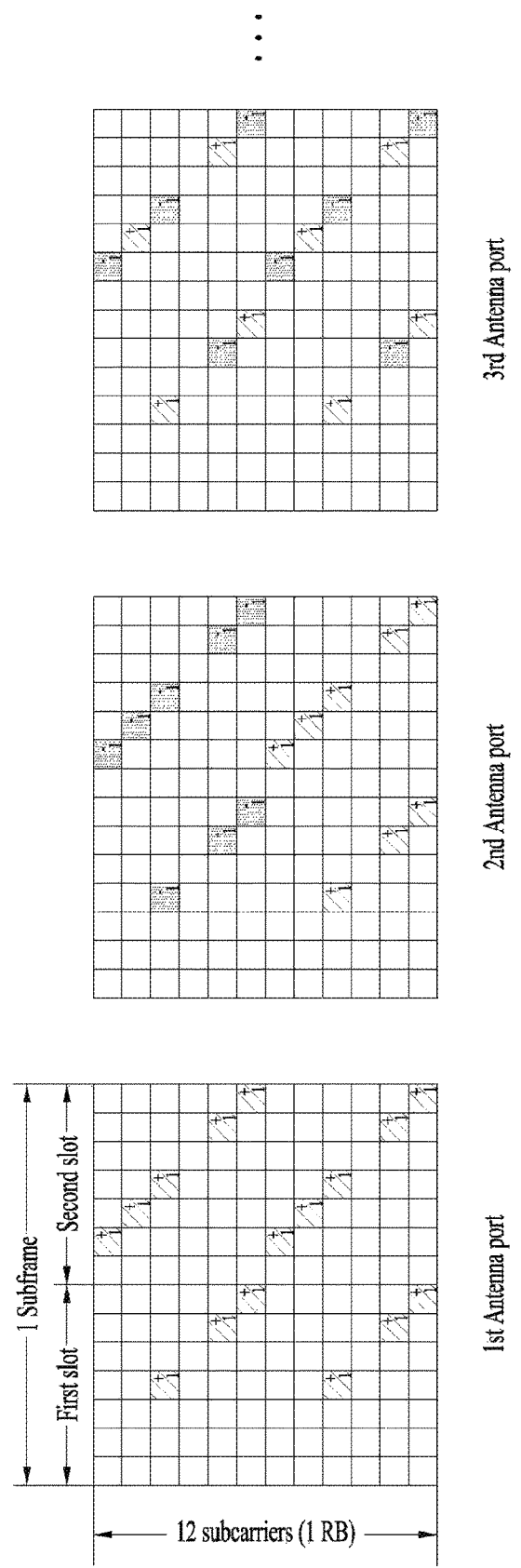
FIG. 9 is a diagram illustrating multi-antenna port PRS RE mapping according to CDM.

FIG. 9 is a diagram illustrating PRS RE mapping through multi-antenna ports to which CDM (code division multiplexing) is applied. In more detail, in FIG. 9, each antenna port of the PRS is identified by applying CDM based on OCC (orthogonal cover code) to REs, and a modulo value for physical cell ID of a transmission base station is 0 and normal CP is used.

Supposing that 16 REs are used for PRS transmission within one subframe, an OCC (for example, walsh code) designed to have orthogonality may be used as a code multiplied by RE corresponding to each antenna port. Although the OCC multiplied by the PRS is mapped in a first frequency index mode in FIG. 9, the OCC may be mapped in a first time mode or random mode as a modified example of this embodiment. At this time, it will be apparent that mapping patterns for mapping the orthogonal code into each antenna port should be the same as one another. Also, as a modified type of application of the OCC, the number of REs to which the OCC is applied within one subframe may be reduced.

Figure 10:
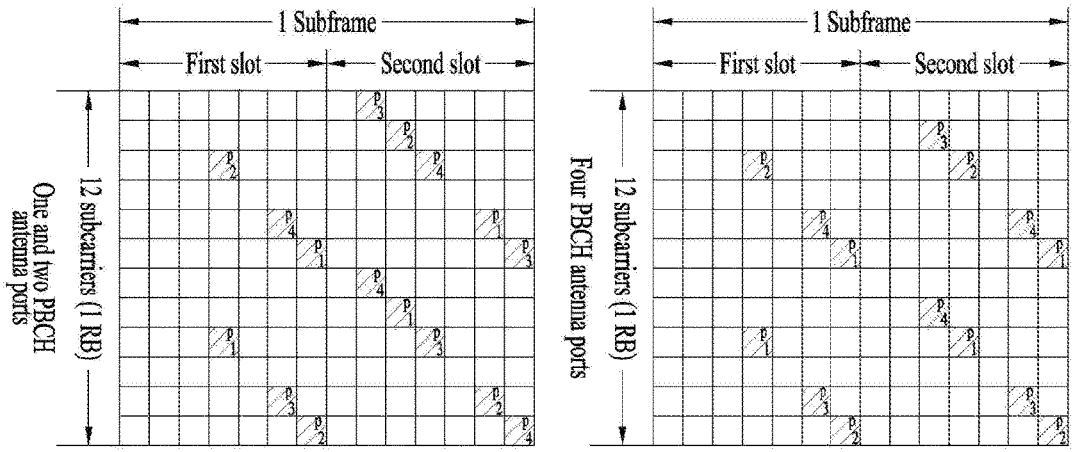
FIG. 10 is a diagram illustrating multi-antenna port PRS RE mapping according to TDM and FDM.
Figure 11:
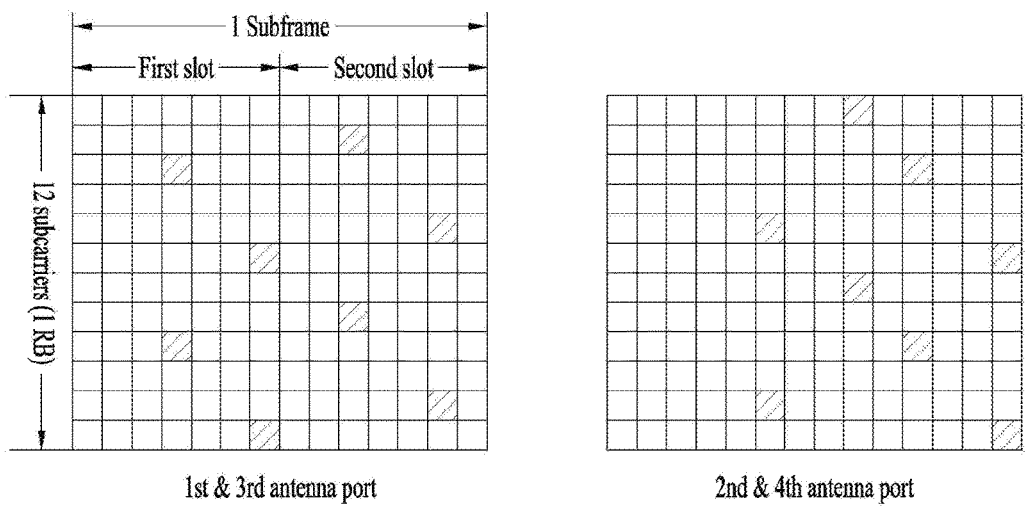
FIG. 11 is a diagram illustrating multi-antenna port PRS RE mapping according to TDM, FDM and CDM.

Alternatively, TDM (time division multiplexing) and FDM (frequency division multiplexing) may be applied to each antenna port without application of CDM as shown in FIG. 10, or CDM together with TDM/FDM may be applied each antenna port as shown in FIG. 11.

RE mapping per antenna port and the mapping patterns for the OCC applied to each antenna port may be designated previously, or may be configured by the base station for the UE, which will perform positioning related estimation, through a higher layer (for example, RRC signaling) within a given set.

Figure 12:
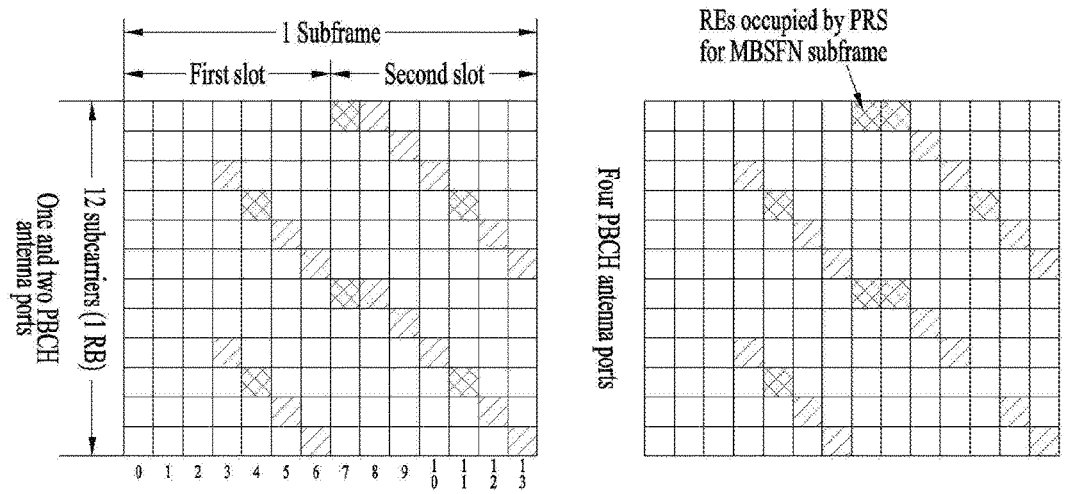
FIG. 12 is a diagram illustrating PRS RE mapping at MBSFN subframe.

According to the 3GPP LTE standard, the base station transmits a CRS (cell-specific reference signal) from a non-MBSFN (multicast and broadcast single frame network) area only at an MBSFN subframe. Therefore, supposing that indexes of OFDM symbols are 0 to 13 in FIG. 8, the UE does not expect that the CRS is transmitted from the fourth, seventh and eleventh OFDM symbols. In this respect, to improve positioning performance of LTE rel-12 & beyond UEs, the transmission base station may transmit the PRS to a specific RE within the fourth, seventh and eleventh OFDM symbols if a subframe designated to transmit the PRS is the MBSFN subframe. FIG. 12 is an example that the PRS is transmitted from an RE additionally designated at the MBSFN subframe. The LTE rel-12 & beyond UE may perform more improved positioning related measurement by using the added PRS RE, and the legacy UE may perform positioning related measurement by using the existing PRS mapping RE only without considering RE, which will newly be used for PRS transmission, without separate effect.

Also, the aforementioned CDM mode to which OCC is applied and the aforementioned FDM+TDM+CDM mode may similarly be applied to even the case that PRS transmission is performed at the MBSFN subframe. At this time, RE mapping per antenna port and the mapping patterns for the OCC applied to each antenna port may be designated previously, or may be configured by the base station for the UE, which will perform positioning related estimation, through a higher layer (for example, RRC signaling) within a given set.

As another embodiment of the present invention, for advanced positioning of higher accuracy, in addition to a macro cell, even TP such as a small cell may transmit the PRS and the UE may perform positioning related measurement. However, in this scenario, if a plurality of RRHs (remote radio heads) below one base station use the same physical cell ID as illustrated in a CoMP scenario 4, a transmission sequence of the PRS is the same as a shift value on the frequency axis related to RE mapping of the PRS, and the UE may have a difficulty in identifying RRH that has transmitted the PRS if a plurality of RRHs transmit the PRS at the same positioning occasion. To solve this problem, methods for transmitting multi-PRS from a plurality of TPs will be described.

Figure 13:
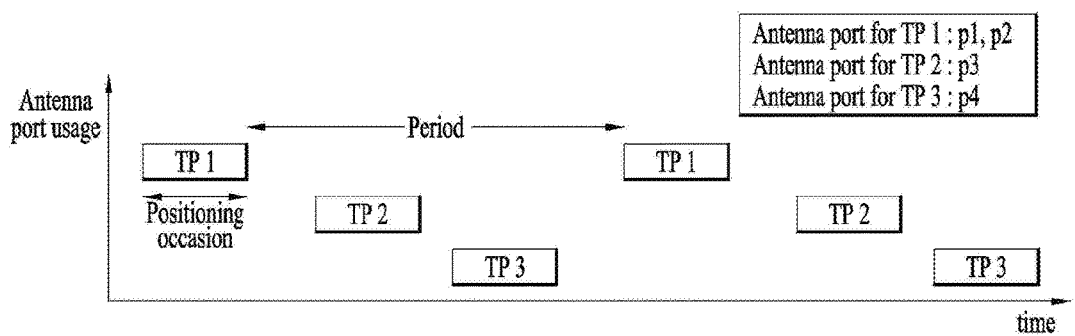
FIGS. 13 and 14 are diagrams examples of positioning occasion allocation for a plurality of TPs having the same physical cell ID.

As a first method, if TPs which use the same physical cell ID desire to transmit the PRS, PRS transmission period and offset may be transmitted by being divided from each other per TP as shown in FIG. 13. However, this method causes a lot of positioning occasions as the number of TPs is increased, whereby excessive overhead may be caused.

Figure 14:
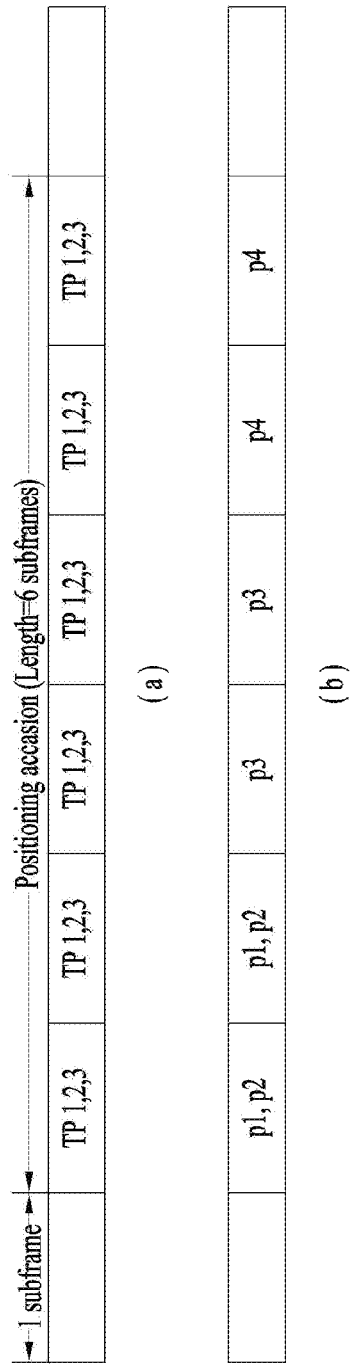

As a second method, antenna ports are divided per TP as shown in FIG. 14(a), whereby the PRS may simultaneously be transmitted at the subframe within the same positioning occasion. At this time, the aforementioned CDM mode or the aforementioned TDM+FDM mode or the aforementioned TDM+FDM+CDM mode may be applied such that the UE may identify each antenna port. The UE may perform positioning related measurement for all antenna ports designated as PRS transmission antenna ports at the positioning occasion corresponding to corresponding physical cell ID.

As a third method, it is suggested that the PRS may be transmitted at only a subframe scheduled per antenna port corresponding to each TP among subframes within the same positioning occasion as shown in FIG. 14(b). At this time, an antenna port used for PRS transmission may be designated per subframe and configured for the UE. As a simpler method, a given number of subframes sequentially determined per TP may be used in turn to transmit the PRS.

Alternatively, in the same manner as the first method, the second method and the third method, in an environment configured such that a specific TP transmits the PRS by using a specific antenna port, the UE may be configured to perform and report positioning related measurement per TP.

If a plurality of TPs having the same physical cell ID transmit multi-antenna port PRS as above, the following information for the PRS, which will be transmitted from each TP, should be given to the UE using a higher layer signal.

Antenna port used for PRS transmission
PRS transmission subframe within positioning occasion
OCC applied to each antenna port
PRS RE mapping for each antenna port Although the above suggestions have been described for the case that a plurality of TPs having the same physical cell ID transmit multi-antenna port PRS, the suggestions may be applied to even the case that a plurality of TPs having different physical cell IDs desire to share the same positioning occasion by sharing one PRS configuration index.

In respect of the aforementioned embodiments of the present invention, detailed PRS related configuration information may be defined as follows.

```
-- ASN1START
PRS-Info ::= SEQUENCE {
    prs-Bandwidth              ENUMERATED { n6, n15, n25, n50, n75, n100, ... },
    prs-ConfigurationIndex     INTEGER (0..4095),
    numDL-Frames               ENUMERATED {sf-1 , sf-2, sf-4, sf-6, ...} ,
    prs-APConfig               ENUMERATED {p1, p2, p3, p4, p1-and-p2, p3-and-
p4, ... }  OPTIONAL,
    prs-SFPatternInfo          CHOICE   {
    sf2                        BIT STRING (SIZE(2)),
    sf4                        BIT STRING (SIZE(4)),
    sf6                        BIT STRING (SIZE(6)),
    ...
    } OPTIONAL,
    prs-OCCConfig              ENUMERATED {OCCpattern1,
OCCpattern2, OCCpattern3, ... } OPTIONAL,
    prs-RePatternInfo          ENUMERATED {Repattern1, Repattern2, Repattern3, ... }
    OPTIONAL,
    ...,
    prs-MutingInfo-r9          CHOICE {
    po2-r9 BIT STRING (SIZE(2)),
    po4-r9 BIT STRING (SIZE(4)),
    po8-r9 BIT STRING (SIZE(8)),
    po16-r9 BIT STRING (SIZE(16)),
    } OPTIONAL -- Need OP
}
-- ASN1STOP
```

In the above higher layer signals, prs-APConfig is an indicator that includes information on an antenna port used for PRS transmission. prs-SFPatternInfo is an indicator that includes subframe information which will transmit PRS to a corresponding antenna port within positioning occasion. prs-OCCConfig is an indicator that includes OCC information applied to a corresponding antenna port, and prs-RePatternInfo is an indicator that includes PRS RE mapping information on a corresponding antenna port.

The above signaling may be configured to include PRS-Info per TP, or may be configured to use one PRS-Info for a plurality of TPs but include parameters identified per TP.

If at least one of the aforementioned parameters, that is, prs-APConfig, prs-SFPatternInfo, prs-OCCConfig and prs-RePatternInfo is configured, the UE performs positioning related measurement by using the PRS only. Alternatively, an explicit signal indicating that positioning related measurement should be performed by the PRS only may be defined together with the above parameter, whereby the UE performs positioning related measurement by using the PRS only if the corresponding explicit signal is given.

When the UE desires to perform positioning measurement, particularly desires to measure RSTD for OTDOA based positioning, the UE may use the PRS or may use the PRS and the CRS together. The UE which can use these two methods (that is, method for using the PRS only and the method for using the PRS and the CRS together) may perform RSTD measurement by determining whether to use the PRS only or both the PRS and the CRS.

In case of LTE Rel-9 OTDOA based positioning, although a homogeneous network (that is, macro eNB exists as a serving cell) has been considered, a heterogeneous network that small cells coexist is recently considered. Particularly, if a plurality of small cells (for example, femto cells) that is associated with one macro cell and uses the same physical cell ID exist, small cells at different positions transmit the CRS generated by the same physical cell ID. If RSTD measurement based on the CRS is used for RSTD measurement for a specific cell, accuracy of RSTD measurement may be reduced.

For another example, if the CRS is used for RSTD measurement even in case of a cell that does not transmit the CRS like a device (for example, beacon that transmits PRS only) that transmits PRS only, accuracy of RSTD measurement may be reduced.

Therefore, when specific measurement (for example, RSTD) is configured, a signal indicating whether a corresponding cell may use the CRS may be defined, and the UE which has received this signal may perform RSTD measurement by using the CRS of the corresponding cell or without using the CRS depending on interpretation.

Alternatively, if the at least one parameter is configured or the explicit signal indicating that positioning related measurement should be performed by the PRS only is defined, or if the signal indicating whether the corresponding cell may use the CRS is defined, the UE may perform the RSTD measurement by using a third reference signal of the cell corresponding to the CRS together with the PRS.

Meanwhile, although prs-APConfig, prs-SFPatternInfo, prs-OCCConfig and prs-RePatternInfo have been mentioned as the PRS related parameters, these titles are only exemplary and may be defined and used as other titles.

As still another embodiment of the present invention, the aforementioned various multiplexing modes (for example, CDM, TDM+FDM, and CDM+TDM+FDM) for the multi-antenna ports may be applied to only a specific time/frequency domain or subframe set, which has been defined or signaled previously.

As further still another embodiment of the present invention, a mapping relationship between a subframe within the positioning occasion and a specific antenna port for transmitting the PRS may be defined previously or configured through signaling. Or, a mapping relationship between the positioning occasion and a specific antenna port for transmitting the PRS may be defined previously or configured through signaling. Or, a mapping relationship between a specific value generated by combination of subframe index and physical cell ID (or virtual cell ID) within the positioning occasion and a specific antenna port for transmitting the PRS may be defined/scheduled previously or configured through signaling. This configuration may also be applied to only a specific time/frequency domain or subframe set, which has been defined or signaled previously.

Since the examples for the aforementioned suggested method may be included in one of the implementation methods of the present invention, it will be apparent that the examples may be regarded as kinds of the suggested methods. Also, the aforementioned suggested methods may be implemented independently but may be implemented in a combination (or merge) type of some of the suggested methods. A rule may be defined to notify the UE of information (or information on rules of the suggested methods) as to application of the suggested methods, from a base station/position server through signaling (for example, physical layer signal or higher layer signal) which is previously defined.

Figure 15:
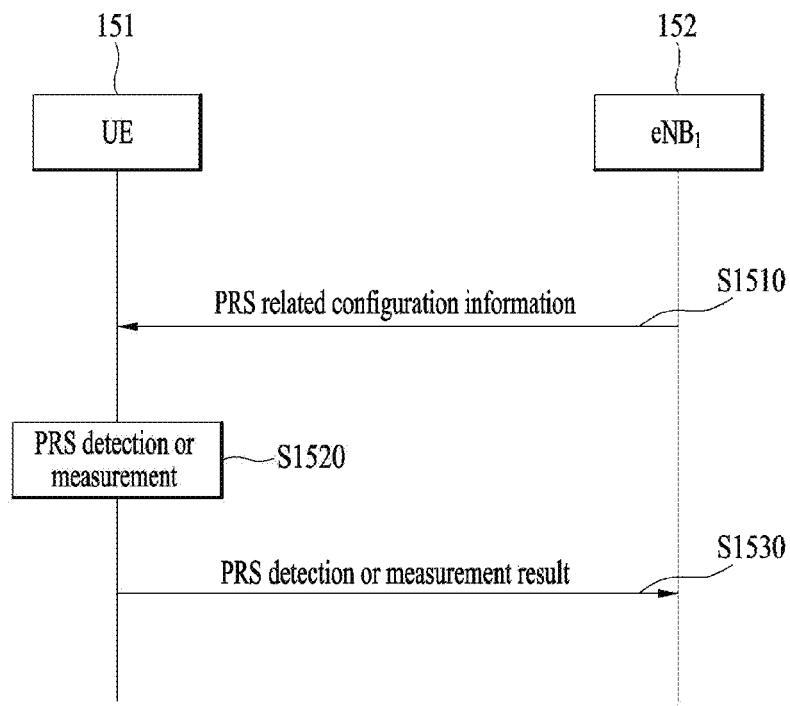
FIG. 15 is a diagram illustrating an operation according to one embodiment of the present invention.

FIG. 15 illustrates an operation according to one embodiment of the present invention.

FIG. 15 relates to a method for receiving a reference signal for positioning in a wireless communication system.

A UE 151 may receive positioning reference signal (PRS) related configuration information transmitted from a plurality of antenna ports (S1510). The UE may detect or measure the PRS by using the PRS related configuration information (S1520). The PRS may be mapped into resource elements (REs) for each of the plurality of antenna ports by multiplexing.

Also, the PRS may be mapped into a specific RE within OFDM symbols, into which the PRS is not mapped at a non-MBSFN subframe, at an MBSFN subframe. An orthogonal cover code for code division multiplexing (CDM) may be used for mapping of the RE, and may be designated for each of the plurality of antenna ports.

The UE may receive information on the orthogonal cover code for each of the plurality of antenna ports.

Also, the plurality of antenna ports may relate to a plurality of transmission devices. If the plurality of transmission devices use the same physical cell ID, each transmission device may transmit the PRS through different ones among the plurality of antenna ports. In this case, the UE may measure the PRS for each of the plurality of transmission devices. Also, the PRS related configuration information may include at least one of antenna port information used for the PRS transmission, subframe information for transmitting the PRS from each antenna port within a positioning occasion for the PRS transmission, orthogonal cover code information applied to each antenna port, and PRS RE mapping information for each antenna port.

Also, the UE may report a detection or measurement result of the PRS (S1530). The measurement result of the PRS may include a measurement result of the PRS for each of the plurality of transmission devices.

Although the embodiments according to the present invention have been described as above with reference to FIG. 15, the embodiment related to FIG. 15 may include at least a part of the aforementioned embodiment(s) alternatively or additionally.

Figure 16:
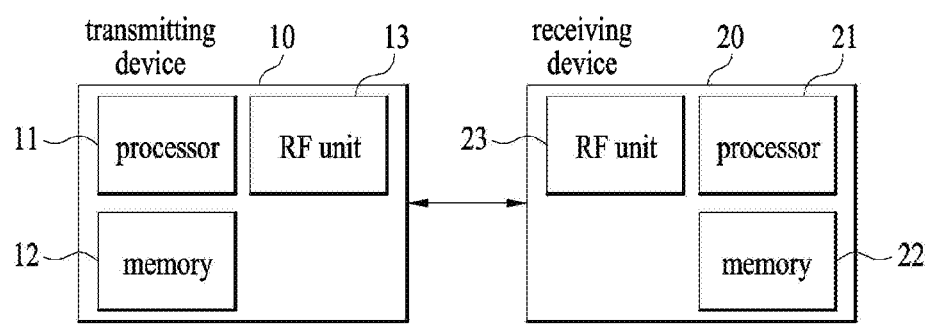
FIG. 16 is a block diagram illustrating an apparatus for implementing the embodiment(s) of the present invention.

FIG. 16 is a block diagram of a transmitting device 10 and a receiving device 20 configured to implement exemplary embodiments of the present invention. Referring to FIG. 16, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a user equipment (UE), a relay and an eNB.

The invention claimed is:

1. A method for receiving a reference signal for positioning in a wireless communication system, the method comprising:
   receiving, by a terminal, configuration information about positioning reference signal (PRS), the PRS being transmitted from a plurality of antenna ports of a plurality of transmission devices;
   measuring, by the terminal, the PRS by using the PRS related configuration information; and
   reporting a measurement result of the PRS,
   wherein the PRS is multiplexed and mapped to resource elements (REs) of each of the plurality of antenna ports using an orthogonal cover code for code division multiplexing (CDM) designated for a respective one of the plurality of antenna ports, and wherein, when the plurality of transmission devices use the same physical cell ID, one or more different antenna ports of the plurality of antenna ports are used for each of the plurality of transmission devices for transmitting the PRS.

2. The method according to claim 1, wherein the PRS related configuration information includes at least one of information about an antenna port used for the PRS transmission, information about a subframe in which each antenna port transmits the PRS within a positioning occasion for the PRS transmission, information about an orthogonal cover code applied to each antenna port, or PRS RE mapping information for each antenna port.

3. The method according to claim 1, further comprising receiving information on the orthogonal cover code for a respective one of the plurality of antenna ports.

4. The method according to claim 1, wherein the PRS is mapped to a specific RE within OFDM symbols, to which the PRS is not mapped in a non-MBSFN (multicast and broadcast single frame network) subframe, in an MBSFN subframe.

5. The method according to claim 1, further comprising reporting a measurement result of the PRS, wherein the measurement result of the PRS includes a measurement result of the PRS for each of the plurality of transmission devices.

6. A terminal configured to receive a reference signal for positioning in a wireless communication system, the terminal comprising:
 a radio frequency (RF) unit; and
 a processor that controls the RF unit,
 wherein the processor:
  receives configuration information about positioning reference signal (PRS), the PRS being transmitted from a plurality of antenna ports of a plurality of transmission devices,
  measures the PRS using the PRS related configuration information, and
  reports a measurement result of the PRS, and wherein the PRS is multiplexed and mapped to resource elements (REs) of each of the plurality of antenna ports using an orthogonal cover code for code division multiplexing (CDM) designated for a respective one of the plurality of antenna ports, and wherein when the plurality of transmission devices use the same physical cell ID, one or more different antenna ports of the plurality of antenna ports are used for each of the plurality of transmission devices for transmitting the PRS.

7. The terminal according to claim 6, wherein the receives information on the orthogonal cover code for a respective one of the plurality of antenna ports.

8. The terminal according to claim 6, wherein the PRS is mapped to a specific RE within OFDM symbols, to which the PRS is not mapped in a non-MBSFN (multicast and broadcast single frame network) subframe, in an MBSFN subframe.

9. The terminal according to claim 6, wherein the processor is configured to report a measurement result of the PRS, and the measurement result of the PRS includes a measurement result of the PRS for each of the plurality of transmission devices.

10. The terminal according to claim 6, wherein the PRS related configuration information includes at least one of information about an antenna port used for the PRS transmission, information about a subframe in which each antenna port transmit the PRS within a positioning occasion for the PRS transmission, information about an orthogonal cover code applied to each antenna port, or PRS RE mapping information for each antenna port.

* * * * *